Oct. 6, 1953   S. E. FRISBIE ET AL   2,654,599
SIDE REGISTRATION CONTROL DEVICE FOR MOVING WEBS
Filed June 27, 1949   2 Sheets-Sheet 1

INVENTORS.
JOSEPH C. FROMMER, WILLIAM O. SMILEY,
STEWART E. FRISBIE
BY Kenneth Swartwood
ATTORNEY

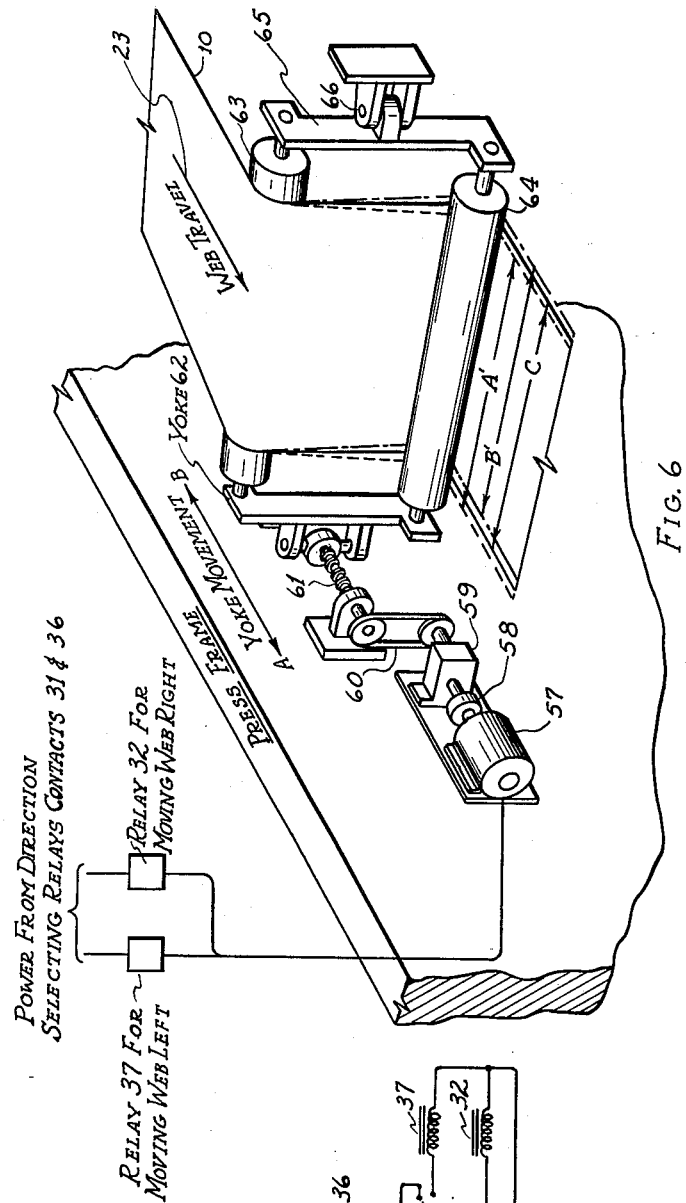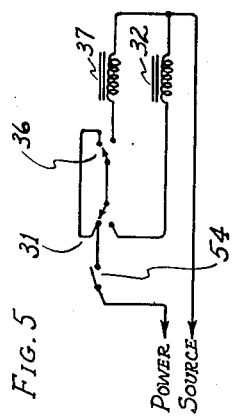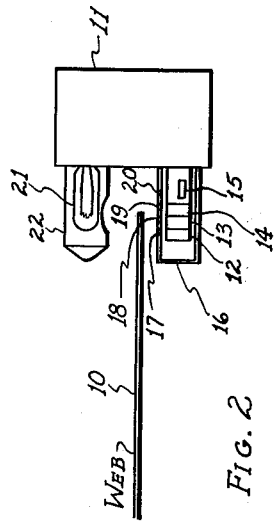

Patented Oct. 6, 1953

2,654,599

UNITED STATES PATENT OFFICE 2,654,599

SIDE REGISTRATION CONTROL DEVICE FOR MOVING WEBS

Stewart Edwin Frisbie and William Owen Smiley, Danville, Ill., and Joseph C. Frommer, Cincinnati, Ohio, assignors to Electric Eye Equipment Company, Danville, Ill., a corporation of Delaware Application June 27, 1949, Serial No. 101,646

2 Claims. (Cl. 271—2.6)

This invention relates to an improved apparatus and electronic circuit for controlling the side movement of moving webs. While it is particularly suited for use in connection with printing operations, it is applicable to controlling or limiting the side movement of any longitudinal moving web such as the rolling or wrapping of paper on rolls. Other uses will occur to those skilled in the art.

Our invention is directed especially to web type printing presses for automatically controlling the sideways position of the web as it passes through the press. While there are some automatic control systems for the positioning of webs, previous devices could not discriminate between slight and large out of register. Generally, it is the usual practice to control the sideways position of the web manually. To make adjustment, the press operator turns the compensator shaft by hand.

In our device the scanner is located close to the point where the register error first occurs, and thus it rapidly detects a wrong condition and initiates correction quickly. With manual correction, the error is allowed to exist from the time it is first made until the operator observes the complete final product which is delivered at the end of the press, a considerable distance from the point of misadjustment. Also, by observing for error continuously at the point where the error may occur, as is done by our device, a more accurate determining of the web in its correct position is made and thus compensation at the correct time is stopped without "overshooting." Thus one of the chief objects of our invention is to prevent "hunting" which occurs in manually controlled devices.

Further by applying our automatic control device to several points of multi-unit presses a constant observation at the various points with consequent quick correction of any error that may develop at any point in the press, is made. With the manual system, the operator can attend to only one adjustment at a time and may allow one error to exist for a considerable period of time while he is attempting to correct another error.

Thus by the use of our invention, because it quickly corrects errors in the side position of the web, the amount of the finished product which is so badly in error that it cannot be used is greatly reduced. This represents a large saving in materials otherwise wasted. Further through the ability of our device to accurately determine the correct web position (once the automatic controls have been correctly set up) and to make corrections quickly, the web is maintained closer to its correct position and the general quality of the acceptable finished product is considerably improved in this respect.

Another advantage of our system is the making of correction at different average speeds depending on how far out of register the web is; i. e., if the web should move only a small distance away from its correct position, a slow average rate of correction is applied while if the web should move a considerable distance out, the correction would be applied at a more rapid average rate until the web is returned close to its correct position where a slower average correction rate is resumed. This system gives maximum accuracy of correction.

In general our correcting method and device embodies a system for applying the correction by a series of pulses when the "out of register" is small and pulses of longer duration or a constant correction when the "out of register" is large. The pulses are so timed that the amount of correction is approximately equal to the amount of error. Actually the rate or speed that the correcting mechanism operates is the same for all cases but the average rate of correction is varied by changing the duration of the pulse of power that operates the correcting mechanism. By always operating the correcting mechanism at maximum speed and controlling the amount of correction applied, corrections are made quickly as well as accurately. Further, in our device the time interval between the correcting pulses allows time for the correction to take effect on the web and allows the web to move to its new position before further correction is made or required. Thus, if the web moves into its correct position in response to a single pulse of correction, this will be detected by the equipment and no further correction pulses will be given until the web again moves out of its correct position. If one pulse of correction does not return the web to its correct position, this condition is detected after a minimum of time delay and additional correction is applied until the web is in its correct position. Thus, allowing this short time delay between correcting pulses prevents over-correction and the resulting "hunting" which would occur. Also operating the correcting mechanism at maximum speed during the pulse provides maximum speed of correction.

Another feature of our invention is in the use of individual phototubes for each direction and each average speed desired, the system can be made very stable. The range of phototube operation from light to dark is several times that required for the amplifiers to operate their respective relays. Hence, factors such as the aging of the exciter lamp causing decreased illumination, aging of phototubes causing decreased sensitivity, inherent variation in new phototubes, exciter lamps or other circuit components affect the circuit a minimum amount and these factors may vary considerably before preventing operation of the system.

Our invention can be best understood by referring to drawings in which:

Figure 2 is a view in elevation of the device shown in Figure 1.

Figure 5 shows the compensation control circuit for shifting the web.

Figure 6 is a schematic and perspective view of a means used for shifting the web.

Figure 1:
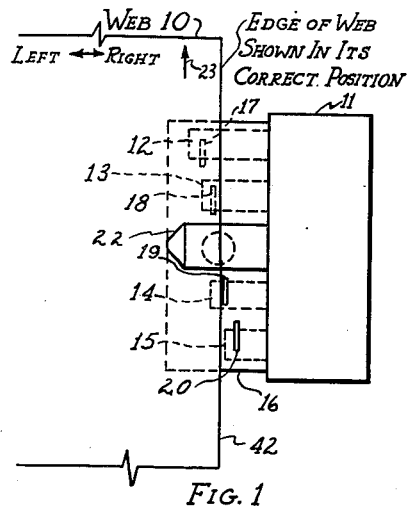
Figure 1 is a diagrammatic plan view of the scanner showing the position of the web relative to the phototubes when the web is in register.
Figure 3:
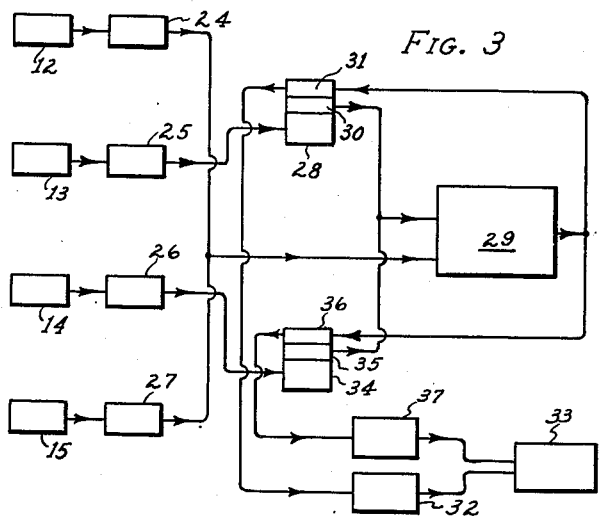
Figure 3 is a block diagram showing the schematic relationship between the various parts of the entire device.

Referring particularly to Figures 1, 2 and 3, we will explain generally the nature and operation of our device. The web 10 is shown in relationship to the optical system when it is in register. The scanner 11 includes besides the wiring circuit (shown in Figure 4) phototubes 12, 13, 14 and 15 enclosed in shield 16 having openings 17, 18, 19 and 20 respectively. An excited light source 21 having a shield 22 is provided. The web is moving in the direction of the arrow 23 and therefore the device will be described throughout in terms of moving from left or right as indicated in Figure 1.

In Figures 1 and 2 when the web is in the correct position phototubes 12 and 13 are dark and phototubes 14 and 15 are in light. The openings or slots 17, 18, 19 and 20 provide a close tolerance for maintaining the web in correct position and for rapidly bringing the web into position when it gets out of register.

The overall operation can be best understood by referring to Figure 3. The scanner 11 must be positioned so that the web 10 will be in its correct or in register position when its edge 42 is between the tolerance slots 18 and 19 (see Figure 1). Then when the web moves to the left it will uncover the slot 18 over phototube 13 and allow light to pass to that phototube. Extreme leftward movement of the web will uncover the slot 17 over phototube 12 and thereby place it in light. Likewise movement of the web to the right covers slots 19 and 20 and interrupts passage of light to phototubes 14 and 15 in succession.

Phototubes 12, 13, 14 and 15 are connected to amplifiers 24, 25, 26 and 27 respectively. Cutting off the light to phototubes 14 and 15 or increasing the light to phototubes 12 and 13 causes current to pass through one or more of the amplifiers 24 to 27 inclusive. Thus if the web moves to the left an amount to uncover slot 18 but not slot 17, amplifier 25 will actuate relay coil 28 and close the contact or switch 30 associated therewith, thereby starting the pulsing device 29, the latter shown in detail in Figure 4. Pulses of power from the pulsing device 29 are fed through contact 31 to another relay 32, operation of which results in moving by means of web positioning mechanism 33, the web to the right as shown in Figures 2 and 6 and as hereinafter described. The pulsing of the relay 32 serves to move the web at an average rate which is slower than the maximum obtainable thereby, providing maximum speed of response while at the same time preventing hunting. Thus if the web moves still farther to the left so that phototube 12 is uncovered, amplifier 24 will act to cause correction being applied to the web steadily or at a higher average rate. In all cases, as the web moves back into its correct position the amplifiers are deenergized to stop the adjustment of the web.

Movement of the web out of register to the right results in a similar sequence of operation. A small movement to the right covers phototube 14, thereby actuating amplifier 26, relay coil 34 containing contacts 35 and 36 and pulsing circuit 29. With contact 36 then closed the pulses of power from the pulsing circuit 29 actuate relay 37 and the web positioning mechanism 33 moves the web to the left and toward its in register position. Also if amplifier 27 is actuated due to phototube 15 being covered, relay 45 will operate closing contact 54 and relay 37 steadily for more rapid movement of the web.

Figure 4:
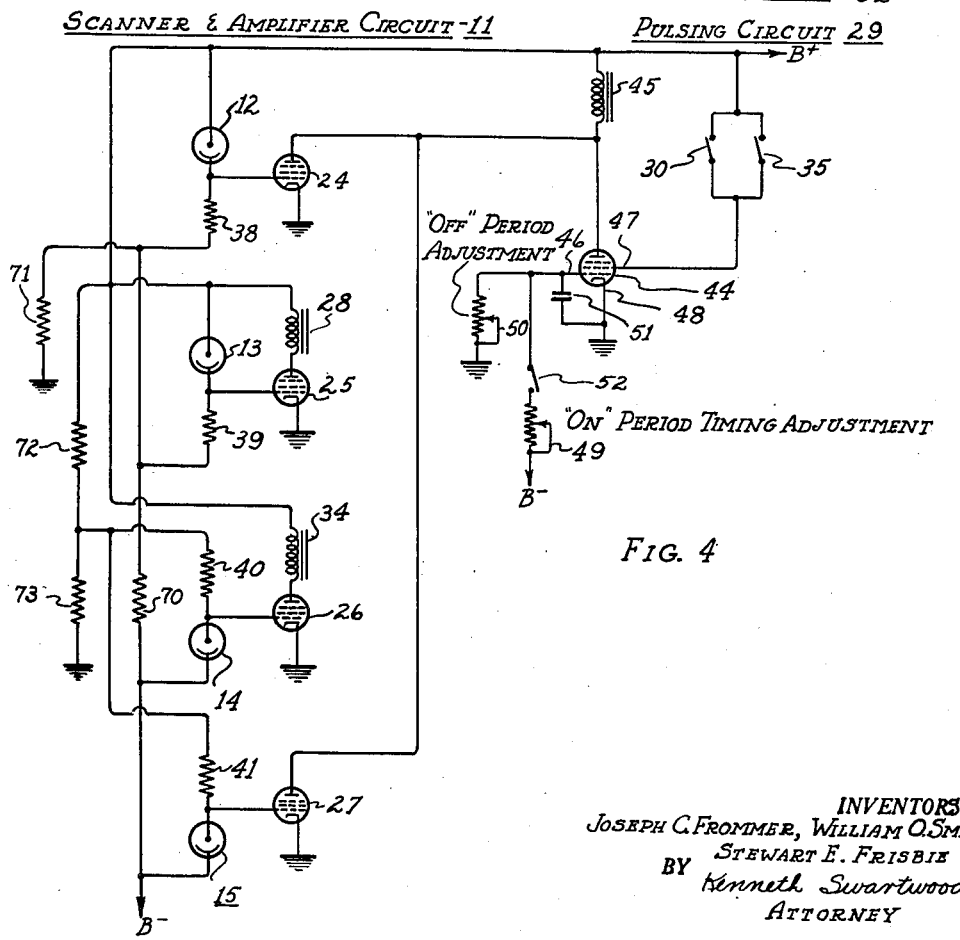
Figure 4 illustrates in more detail the scanner and pulsing circuit.

Now we will describe the details of the scanner circuit 11 and the pulsing circuit 29 by referring to Figure 4. Each of the phototubes 12, 13, 14, and 15 are connected in series with resistors 38, 39, 40 and 41 respectively. The entire circuit of Figure 4 receives its energy from a direct current voltage source having a positive terminal B+ and a negative terminal B—. Negative grid bias for tubes 24, 25 is provided by the voltage divider consisting of resistors 70 and 71; and positive grid bias for tubes 26, 27 is provided by the voltage divider consisting of resistors 72, 73. The amplifier tubes 24, 25, 26 and 27 have their respective grids connected between their respective phototubes and resistors. Under the condition existing when the web is in its correct position, phototubes 12 and 13 are dark giving them a high electrical resistance while phototubes 14 and 15 are illuminated and therefore have a lower resistance. Thus under these conditions, the grids of all the amplifiers are held at a negative voltage thereby preventing sufficient current from flowing through the amplifiers to operate either of the relays 28 and 34 or the pulsing circuit relay 45.

When the web moves to the left, light is admitted to phototube 13 which decreases its resistance and allows more current to flow through resistor 39. This raises the voltage applied to the grid of amplifier 25 which then causes sufficient current to flow through the amplifier 25 to operate the relay coil 28. A similar operation results on amplifier 24 when the web moves and light is admitted to phototube 12. The current through amplifier 24 is then sufficient to operate relay coil 45.

When the web moves toward the right, light is cut off from phototubes 14 and 15 (in succession) which increases their resistances and decreases the current flowing through resistors 40 and 41. Since these resistors are on the positive side of the phototubes, the grid voltages of amplifiers 26 and 27 are raised to the point where the associated relays are operated.

The scanner and the amplifier circuit 11 above described are connected to the pulsing circuit 29 which controls the required amount of correction. In the circuit 29, the pulsing tube 44 is connected so that normally it does not conduct sufficient current to operate relay coil 45. Even though the control grid 46 of tube 44 is at ground potential as is its cathode 48, the current which it conducts is low because normally there is no voltage applied to its screen grid 47. Operation of relay coil 28 or 34 as described previously, closes contact 30 or 35 respectively, applies B+ voltage to the screen grid 47 and current increases sufficiently to operate relay 45. When relay 45 operates, contact 52 connects the control grid 46 and the timing condenser 51 to B—. This provides a series circuit consisting of the "on" period potentiometer 49 and the "off" period potentiometer 50 connected between B— and ground with the control grid 46 and the timing condenser 51 tapped off between the two potentiometers. Consequently the timing condenser 51 charges negatively slowly and causes the control grid 46 to go negative gradually. As the grid voltage decreases, the current through the tube 44 decreases until the point is reached where current will no longer hold the relay 45 closed and as the relay is released, contact 52 opens. When this occurs, the grid 46 and condenser 51 are disconnected from B— allowing the timing condenser 51 to discharge through the "off" period potentiometer 50 and the control grid 46 gradually approaches ground. As soon as the grid voltage rises high enough to provide sufficient current in the pulsing tube 44, relay coil 45 closes contact 52 and the cycle repeats. As long as the voltage on the screen grid 47 is applied and neither amplifiers 24 or 27 are actuated, relay coil 45 continues this pulsing operation. Contact 54 also is operated by relay 45 and it opens and closes the circuit (see Figure 5) to relays 32 and 37 as relay 45 pulses. If either amplifier 24 or 27 is actuated as described before, the current through relay coil 45 will be sufficient to keep contacts 52 and 54 closed regardless of the current flowing through tube 44 since current is then flowing continuously through relay coil 45, and amplifier 24 or 27. Thus actuation of tube 24 or 27 results in a steady supply of voltage through contacts 54 and 31 or 36 to the web compensator and the position of the web then is corrected at a higher speed than is obtained with the pulsing correction caused by amplifiers 25 and 26 alone. Thus rapid correction is applied at all times while "hunting" and "overshooting" is prevented. The fast correction applied by tubes 24 and 27 is slowed down by resumption of the slow correction applied by tubes 25 and 26 as the web moves back close to its correct position. This an essential feature of our device.

In the given example, the current of tubes 24, 27 was conducted across relay 45 causing its continuous operation. Faster operation can also be obtained without stopping pulsations of relay 45 but by increasing the time of each pulse or decreasing the time between two consecutive pulses or both. This can be achieved by conducting the current of tubes 24, 27 across a separate relay and connecting the contacts of this separate relay to shunt resistor 50 by another resistor of suitable value, to insert between resistor 49 and ground another resistor of suitable value, or both.

The circuit above described operates certain relay contacts for controlling the web shifting mechanism 33 as follows: Referring to Figure 5, when relay coil 28 is operated, contact 31 is shifted to complete a circuit from contact 54, operated by relay 45, through the normally closed position of contact 36, operated by relay 34, to the coil of relay 32. Then whenever relay 45 operates to close contact 54, relay 32 is operated and causes the web changing mechanism of Figure 6 to move the web 10 to the right. In a similar manner, operation of relay 34 shifts contact 36 to close the circuit from contact 54 through the normally closed position of contact 31 to the coil of relay 37, and closing of contact 54 by operation of relay 45 will cause operation of relay 37 which, in turn, causes the web changing mechanism of Figure 6 to move the web to the left.

Contacts 31 and 36 are so interconnected that after one has been shifted to complete a circuit, as described above, shifting, inadvertently or otherwise, of the other will then open that circuit. Likewise, the second of the two to shift cannot complete its circuit because of the shifted position of the first. By this circuit, means are provided such that the web correction mechanism cannot be energized for both directions at once.

Now we will describe how the web correction or positioning mechanism is controlled by the circuits above described. Referring to Figure 6, when the web moves away from its correct position as previously described, toward the right (directions are relative to direction of web travel 23) to position A; power is applied to relay 37 which results in moving the web to the left until web assumes correct position C. Similarly when the web gets out of register toward the left as indicated by position B', relay 32 moves web to the right toward the in register position C. The reversible driving means 57 is connected through a flexible coupling 58, speed reducer 59, and coupling means 60, to a threaded shaft 61. On the threaded shaft 61 is a moveable yoke 62, which carries the free ends of the dual tilt rollers 63 and 64. The other ends of the rollers are connected to a second yoke 65 which pivots at point 66. The web 10 is threaded through rollers 63 and 64 in the manner shown.

If the rollers 63 and 64 are tilted to any angle other than perpendicular to the direction of web travel 23 the web will be directed off to one side or the other when it passes over the upper roller 63. Then as the web passes under the lower roller 64, it will be redirected parallel to the original web but will be displaced sideways.

Dotted lines conforming to position A' indicate the direction of repositioning of the web due to movement of yoke toward A. Likewise movement of the yoke toward B moves web toward position B', indicated by dash lines. Thus relay coils 37 and 32 through the reversible driving means 57 can shift the web to the left or to the right.

It is understood that the above embodiments are given to illustrate our invention and other embodiments are possible within the scope of the following claims.

We claim:

1. In a device for correcting the variance in the lateral displacement of a longitudinal moving web from a predetermined position, the improvement comprising a photoelectric scanning device positioned along one edge of said web having a light source positioned on one side of the web and phototubes with light shield positioned on the opposite side of said web, said light shield positioned in respect to said light source and said web such that when said web is in its predetermined lateral position some of said phototubes are in light and some in shadow, with those in shadow positioned in spaced increments in one direction away from said edge of said web and those in light positioned in spaced increments in the opposite direction from said edge, a control circuit comprising amplification means for each of said phototubes and having a plurality of relays operated under control of said phototubes such that as the web changes in amount of deviation in one direction from its predetermined position a portion of said relays is operated continuously and one other of said relays is operated intermittently, and when said web deviates further from its predetermined position said one of said relays is operated continuously, means for moving said web laterally controlled by said relays, said relays causing pulses to pass through said control circuit when said relays are controlled by the phototubes adjacent the edge of the web in its predetermined position thereby periodically operating said lateral moving means, and said relays causing said control circuit to operate continuously with resulting continuous operation of said web moving means when said relays are controlled by the phototubes farther removed from the edge of said web.

2. In a device for correcting the variance in the lateral displacement of a longitudinal moving web from a predetermined position, the improvement comprising a photoelectric scanning device positioned along one edge of said web having a light source positioned on one side of the web and phototubes positioned on the opposite side of said web, said phototubes positioned in respect to said light source and said web such that when said web is in its predetermined lateral position some of said phototubes are in light and some in shadow, with those in shadow positioned in spaced increments in one direction away from said edge of said web and those in light positioned in spaced increments in the opposite direction from said edge, an electronic circuit having amplification means connected with each of said phototubes, a plurality of control means operatively connected with said amplification means, said control means having a plurality of relays operated under control of said phototubes such that as the web changes in amount of deviation in one direction from its predetermined position a portion of said relays is operated continuously while one other of said relays is operated intermittently, and when said web deviates further from its predetermined position said one of said relays is operated continuously, means for moving said web laterally operatively connected with and responsive to said control means, and means controlled by said operated relays for increasing the degree of movement of said web moving means and depending on the lateral deviation of said web from its predetermined position.

STEWART EDWIN FRISBIE.
WILLIAM OWEN SMILEY.
JOSEPH C. FROMMER.

References Cited in the file of this patent

UNITED STATES PATENTS

| Number | Name | Date |
| --- | --- | --- |
| 2,078,669 | King | Apr. 27, 1937 |
| 2,117,878 | Friedemann | May 17, 1938 |
| 2,220,736 | Stockbarger | Nov. 5, 1940 |
| 2,444,261 | Kelling | June 29, 1948 |